United States Patent
Hallak et al.

(10) Patent No.: US 11,397,530 B2
(45) Date of Patent: *Jul. 26, 2022

(54) TECHNIQUES FOR PROLONGING LIFESPAN OF STORAGE DRIVES

(71) Applicant: Vast Data Ltd., Tel Aviv (IL)

(72) Inventors: Renen Hallak, Tenafly, NJ (US); Vladimir Zdornov, Kfar Saba (IL); Yogev Vaknin, Karkur (IL); Asaf Levy, Tel Aviv (IL); Alex Turin, Kiryat Ono (IL)

(73) Assignee: Vast Data Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/088,204

(22) Filed: Nov. 3, 2020

(65) Prior Publication Data

US 2021/0132818 A1    May 6, 2021

Related U.S. Application Data

(63) Continuation of application No. 16/207,732, filed on Dec. 3, 2018, now Pat. No. 10,877,671.

(51) Int. Cl.
*G06F 3/06* (2006.01)

(52) U.S. Cl.
CPC .......... *G06F 3/0616* (2013.01); *G06F 3/0659* (2013.01); *G06F 3/0689* (2013.01)

(58) Field of Classification Search
CPC .... G06F 3/0616; G06F 3/0659; G06F 3/0688; G06F 3/0689
See application file for complete search history.

(56) References Cited

U.S. PATENT DOCUMENTS

| | | | |
|---|---|---|---|
| 2008/0183950 A1* | 7/2008 | Roohparvar | G06F 12/0246 711/103 |
| 2009/0138654 A1 | 5/2009 | Sutardja | |
| 2010/0017555 A1 | 1/2010 | Chang et al. | |
| 2011/0078496 A1 | 3/2011 | Jeddeloh | |
| 2011/0271043 A1 | 11/2011 | Segal et al. | |
| 2014/0281133 A1 | 9/2014 | Karamcheti et al. | |
| 2016/0034387 A1 | 2/2016 | Megarity et al. | |
| 2017/0149890 A1 | 5/2017 | Shamis et al. | |
| 2017/0199817 A1 | 7/2017 | Ishihara et al. | |
| 2017/0242625 A1 | 8/2017 | Pandurangan et al. | |
| 2017/0277608 A1 | 9/2017 | Shi et al. | |
| 2017/0285948 A1 | 10/2017 | Thomas et al. | |
| 2017/0285971 A1 | 10/2017 | Dai et al. | |
| 2018/0307598 A1* | 10/2018 | Fischer | G06F 3/0659 |

OTHER PUBLICATIONS

Boboila, et al., "Write Endurance in Flash Drives: Measurements and Analysis", Boston, MA., Conference Paper, 2010, url last updated Jul. 31, 2018, https://www.researchgate.net/publication/262407172_Write_Endurance_in_Flash_Drives_Measurements_and_Analysis.

Luo, et al., "WARM: Improving NAND Flash Memory Lifetime with Write-hotness Aware Retention Management", 2015, IEEE, pp. 1-14.

* cited by examiner

*Primary Examiner* — Larry T Mackall
(74) *Attorney, Agent, or Firm* — M&B IP Analysts, LLC

(57) ABSTRACT

A system and method for prolonging lifespans of storage drives. The method includes determining an expected expiration time for each of a plurality of blocks, wherein each block includes data of a respective file, wherein the expected expiration of each block is determined based on a file type of the respective file; and writing a portion of data to at least one block of the plurality of blocks based on the expected expiration time for each block.

21 Claims, 5 Drawing Sheets

US 11,397,530 B2

TECHNIQUES FOR PROLONGING LIFESPAN OF STORAGE DRIVES

CROSS-REFERENCE TO RELATED APPLICATIONS

This application is a continuation of U.S. patent application Ser. No. 16/207,732 filed on Dec. 3, 2018, now allowed, the contents of which are hereby incorporated by reference.

TECHNICAL FIELD

The present disclosure relates generally to computer storage, and more specifically to prolonging the lifespan of drives in storage systems.

BACKGROUND

One of the main concerns when working with Flash drives is the lifespan of the drives. Flash and solid state drives are limited in the number of times that they can be written to, also referred to as the number of write cycles for the drive. Once this limit is passed, additional data cannot be written to the drive. As a result, storage systems that use Flash drives have a limited effective lifespan.

When data is written, it is preferable to write to blocks in an erased state. If no location with sufficient erased blocks is found, the data in an occupied block must first be erased before new data can be written. A block may contain both valid data to be preserved as well as invalid data that is no longer necessary. To this end, the valid data in the block is first copied out of the block in order to erase it and free up space in a process referred to as garbage collection. This results in an effect known as write amplification.

Some storage systems utilize Redundant Array of Independent Disks (RAID) technology to provide data redundancy and/or performance improvement. RAID technology combines multiple physical drives into logical units known as stripes and provides redundancy that avoids data loss in the event that one or more drives fail. Data in each stripe is distributed across the physical drives. Like in other storage schemes, storage systems using RAID schemes can delete data in stripes to make room for new data by copying data remaining in the stripe before erasing the stripe.

To address these limitations, some enterprise storage systems use high-end Flash drives that have longer lifespans to effectively increase the lifespan of the storage system. These high-end Flash drives provide longer lifespans by significantly over-provisioning the drive (i.e., maintaining a significant amount of space that is not exposed to users) and using fewer bits per cell than consumer grade drives. Use of high-end Flash drives can prolong the lifespan of the drives. However, these better performing Flash drives are more expensive than other drives. As a result, this solution increases the overall cost of the storage system. Additionally, since these solutions require high-end drives to provide longer lifespans, existing solutions using consumer grade drives are unsuitable for uses requiring longer lifespans.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for prolonging lifespans of storage drives. The method comprises: determining an expected expiration time for each of a plurality of blocks, wherein each block includes data of a respective file, wherein the expected expiration of each block is determined based on a file type of the respective file; and writing a portion of data to at least one block of the plurality of blocks based on the expected expiration time for each block.

Certain embodiments disclosed herein also include a non-transitory computer readable medium having stored thereon causing a processing circuitry to execute a process, the process comprising: determining an expected expiration time for each of a plurality of blocks, wherein each block includes data of a respective file, wherein the expected expiration of each block is determined based on a file type of the respective file; and writing a portion of data to at least one block of the plurality of blocks based on the expected expiration time for each block.

Certain embodiments disclosed herein also include a system for prolonging lifespans of storage drives. The system comprises: a processing circuitry; and a memory, the memory containing instructions that, when executed by the processing circuitry, configure the system to: determine an expected expiration time for each of a plurality of blocks, wherein each block includes data of a respective file, wherein the expected expiration of each block is determined based on a file type of the respective file; and write a portion of data to at least one block of the plurality of blocks based on the expected expiration time for each block.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
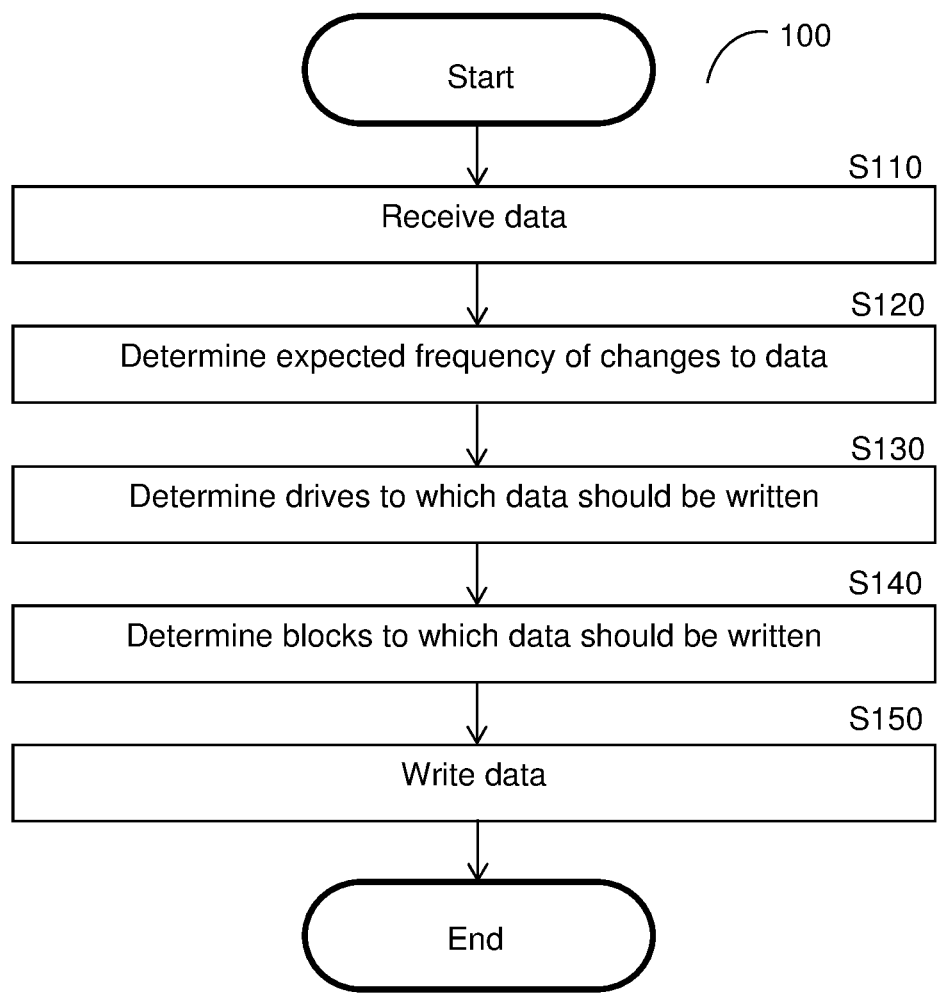
FIG. 1 is an example flowchart illustrating a method for prolonging lifespan of drives in a storage system including multiple drives according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for prolonging the lifespan of storage drives. Specifically, the disclosed embodiments provide techniques for reducing numbers of writes in storage drives and, in particular, storage drives having relatively low endurance. Since the number of writes possible during the lifetime of a drive is limited, reducing the number of writes to a low endurance drive may significantly prolong the lifespan of the drive and, consequently, any storage system including the drive. To this end, various sources of write amplification have been identified. The disclosed embodiments address these sources to reduce or avoid write amplification.

In an embodiment, high endurance drives are used in combination with low endurance drives to store data which changes frequently without requiring writing to the low endurance drives. The high endurance drives have a higher total lifespan (e.g., as measured in a total number of write cycles possible for the drives) than the low endurance drives. The frequently changing data may include, but is not limited to, temporary data written by external users, internal metadata, and the like. Use of a few high endurance drives does not significantly impact the cost of a storage system, and the high endurance drives may be used to prevent excessive writing to the low endurance drives, thereby extending the effective lifespan of the low endurance drives and of the storage system as a whole. Additionally, when multiple drives are used, storage loads may be distributed among drives based on lifespan by writing to drives with the longest remaining lifespans.

As discussed above, the number of times storage devices such as Flash drives can be written to is limited. The data in a drive may be characterized with respect to pages and erase blocks, where a page is the smallest unit of data tracked by the drive (e.g., 4 kilobytes) and the erase block is the smallest unit of data that can be erased by the drive. To write in a page, the block containing the page must first be erased. That block is the erase block for that write.

Also discussed above, freeing space in drives is typically performed in a process called garbage collection. Because data is copied during this process, additional writes need to be performed to erase the data. Accordingly, garbage collection leads to write amplification that reduces the lifespan of the drive. To this end, the embodiments disclosed herein provide techniques that reduce or avoid write amplification to prolong the lifespans of storage drives. Due to the prolonged lifespans, drives may be used for longer periods of time with less frequent replacements. In particular, the disclosed embodiments may allow for using consumer-grade Flash drives or other low cost, low endurance drives in applications where they would previously be unsuitable due to insufficient lifespan.

In storage systems utilizing Redundant Array of Independent Disk (RAID) schemes, data is typically divided into stripes spread across multiple drives, with each drive containing a chunk from a stripe. Like deleting data in erase blocks to free space for garbage collection in other drives, freeing space in drives implementing RAID schemes involves reclaiming stripes by copying data. To this end, in another embodiment, lifespans of drives used for RAID schemes may be prolonged by aligning RAID chunks with erase blocks of a drive. When a stripe is reclaimed, the storage system may send a notification to a respective drive indicating its erase block is free, thereby eliminating the need for the drive to perform its own garbage collection in addition to the stripe reclamation. Thus, the total number of writes is reduced.

In yet another embodiment, numbers of writes may be reduced by storing portions of data expiring around the same time in the same erase block. To this end, in such an embodiment, a file system is analyzed to determine an expected expiration time for each portion of data stored therein. Storing portions of data that will expire around the same time together reduces write amplification since less data needs to be copied out of the erase block in order to rewrite it.

For storage systems using RAID schemes, write amplification may be minimized during stripe reclamation by reclaiming stripes based on one or more criteria such as amounts of stripe-occupied space, projected time for release of data from a stripe (for example, an expected expiration time for data in the stripe), and wear level (i.e., amount of times data is written) of blocks included in the stripe.

In another embodiment, the lifespan of a drive may be prolonged by manipulating the write pattern of writes made to the drive. Such manipulation may include modifying the write pattern with respect to write sizes, times between writes, distributions of writes, write concurrency (e.g., numbers of concurrent streams of writes), and size and timing of trim calls to the drive. To this end, it has been identified that many drives perform better when writing to the drive is performed sequentially and that the number of concurrent streams may impact how a drive manages its internal cache and distributes writes among erase blocks. It has been identified that specific effects these factors may have on drives may vary from one drive to the next and, in particular, may vary based on drive models as well as age and remaining write cycles.

FIG. 1 shows an example flowchart 100 illustrating a method for prolonging lifespan of drives in a storage system including multiple drives according to an embodiment. In an embodiment, the method of FIG. 1 is used to prolong the lifespan of drives in a storage system including both low endurance drives and high endurance drives (e.g., the distributed storage system 510 shown in FIG. 5). The method may be performed by a system (e.g., one of the CNodes 512, FIG. 5) integrated in or communicating with the storage system.

Each low endurance drive has a lower total lifespan (e.g., as measured in a total number of writes that the drive can accept before failure, i.e., a total number of write cycles for the drive) than each high endurance drive. In an example implementation, the low and high endurance drives are Flash drives. More specifically, in some implementations, the Flash drives may be, for example but not limited to, 3D Xpoint drives.

At S110, data to be written to the storage system is received.

At S120, an expected frequency of changes to the received data is determined. In an example implementation, the expected frequency may be either high (i.e., frequently changes) or low (i.e., does not change frequently).

In an embodiment, the expected frequency is determined based on a type of the received data. As a non-limiting example, high frequency data may include temporary data written by an external user of the storage system, internal metadata of the storage system (i.e., metadata used by the storage system which may change relatively frequently and typically does not occupy a large amount of space), data in temporary files (e.g., a file having the extension ".tmp"), and the like.

In a further embodiment, the expected frequency may be determined using a machine learning model trained based on a training data set including data related to file creations and deletions. Thus, a predicted time of deletion may be determined based on, for example, the contents or type of a file and its creation time. The expected frequency may be determined based on the predicted time of deletion, for example, such that predicted times of deletion above a threshold may result in determining that the data is high frequency and, otherwise, that the data is low frequency.

At S130, one or more drives to which the received data should be written is determined. In an embodiment, the drives are determined based on the expected frequency of changes to the received data. Specifically, high endurance drives are determined for data having a high expected frequency of changes while low endurance drives are determined for data having a low expected frequency of changes.

Selecting drives to which data should be written based on the expected frequency of changes to the data allows for using a low number of high endurance drives as compared to the total number of drives used by the storage system to handle data that will cause significant write amplification. Thus, the lifespan of low endurance drives in the storage system may be prolonged, thereby leading to a longer effective lifespan of the storage system.

In a further embodiment, the determination may be further based on a remaining lifespan of each drive in the storage system. The determined drives may be drives having the highest remaining lifespan (e.g., the highest number of remaining write cycles) among high or low endurance drives (for high expected frequency data and low expected frequency data, respectively) in the storage system. To this end, the storage system (e.g., via one or more compute nodes) may be configured to track numbers of writes to each drive as well as a number of writes in the total lifespan of each drive such that the remaining number of writes in each drive's lifespan is equal to the difference between the total lifespan and the number of writes to the drive thus far. Writing to drives having the highest remaining lifespan allows for effectively sharing the write load among drives and, consequently, allowing the storage system to continue serving writes for a longer period of time than storage systems which may continue writing to the same drives until failure while ignoring drives with remaining lifespans.

At S140, one or more blocks to which the received data should be written are determined. The determined blocks are blocks included in the determined drives. The determination of blocks may prioritize empty blocks and may erase blocks when there are not enough empty blocks available in the determined drives. In an embodiment, when insufficient empty blocks are available, S140 may further include determining one or more erase blocks having the most remaining write cycles left as the blocks to which data should be written. To this end, the storage system may be configured to track numbers of writes to each block in each drive as well as an expected number of write cycles permitted by each block. Like determining drives to be written based on remaining lifespans, determining blocks to be written based on remaining write cycles allows for distributing write loads, thereby prolonging the lifespan of each drive as well as the storage system. Specifically, the write loads may be distributed both between drives of the storage system and within each drive.

In an embodiment, the blocks to which the received data should be written are determined based further on an expected expiration time for the received data. Specifically, in such an embodiment, the determined blocks include data that has the same expected expiration time or approximately the same expected expiration time (e.g., within a threshold time duration) as the received data. To this end, S140 may further include determining an expected expiration time for the received data. Storing portions of data that expire at the same time in the same erase block allows for reducing write amplification since less data needs to be copied out of the erase block when rewriting it.

The expected expiration times may be determined based on file writing and deletion data including any of file type, last file update time, updates to neighboring files from the same parent directory, deletions of neighboring files from the same parent directory, updates to similar files on the system, deletions of similar files from the system, file entropy, or a combination thereof. To this end, S140 may further include applying a machine learning model trained using a training set including file writing and deletion data. The model, once trained, is configured to use file write and deletion data with respect to a drive as inputs and to output an expected expiration time for the drive. The machine learning may further include deep learning.

At S150, the received data is written to the determined blocks in the determined drives. When the determined blocks are not free (i.e., they are occupied with data), S150 further includes causing erasure of the existing data in the determined blocks before storing the new received data. The erasure may be prompted by attempting to store the received data in the determined drives.

It should be noted that FIG. 1 is illustrated in the order shown merely for example purposes, and that steps of the methods disclosed herein are not necessarily limited to the specific orders shown herein. In particular, for FIG. 1, steps S130 and S140 may be performed in a different order. In such an implementation, drives to which data may be written can be determined preliminarily such that a final determination of drives to which the data will be written is based on which drives include the determined blocks to which data should be written.

Figure 2:
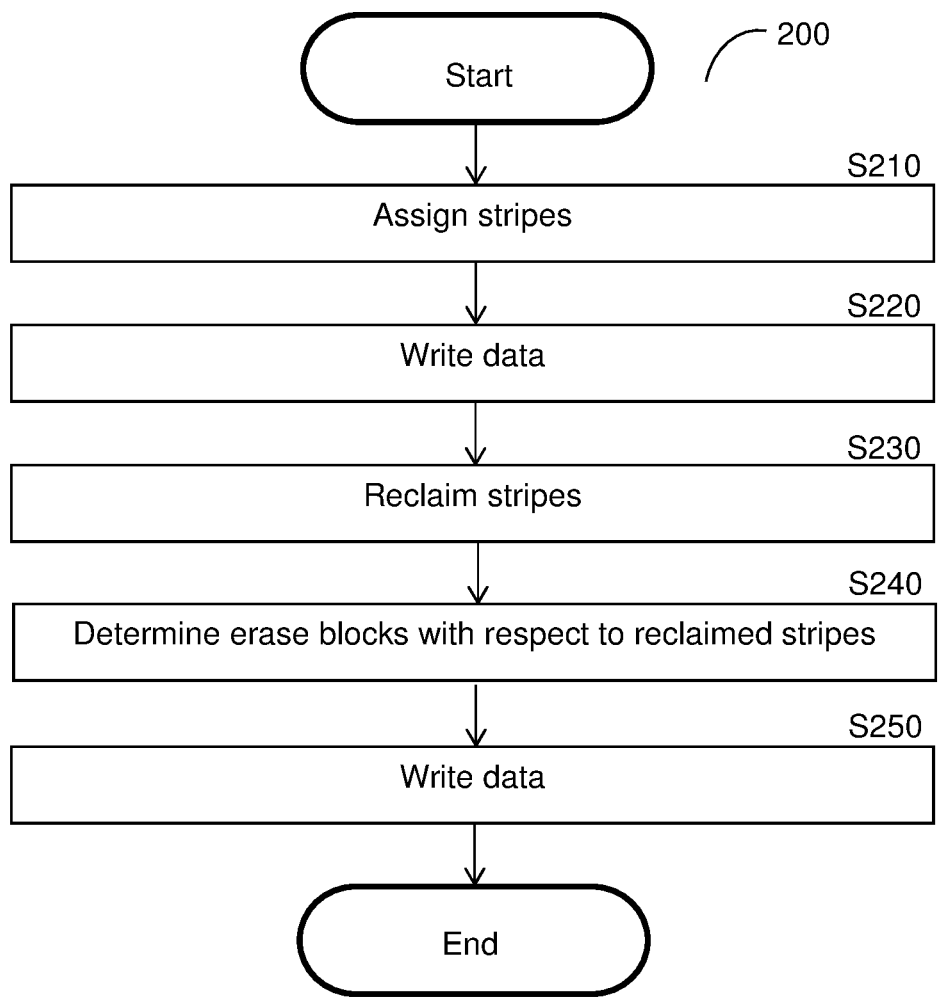
FIG. 2 is a flowchart illustrating a method for reduced write amplification in a storage system utilizing a RAID scheme according to an embodiment.

FIG. 2 is an example flowchart 200 illustrating a method for reduced write amplification in a storage system utilizing a RAID scheme according to an embodiment. The method may be performed by a system (e.g., one of the CNodes 512, FIG. 5) integrated in or communicating with the storage system. In the embodiments described with respect to FIG. 2, the storage system utilizes a RAID scheme that involves striping such that data is divided into stripes spread among drives of the storage system, with each drive storing a portion of each stripe (e.g., a portion of data or parity of the stripe) referred to as a RAID chunk.

At S210, the RAID scheme is established and stripes are assigned. In an embodiment, S210 includes aligning the RAID chunks of the stripes to erase blocks of the drive such that each RAID chunk includes one or more erase blocks of the respective drive. Aligning the RAID chunks with erase blocks allows for tracking available space by the storage system rather than individually by each drive. Consequently, when a stripe is reclaimed, the storage system can notify each drive that its respective erase blocks aligned with chunks of the stripe are available so that the drives do not need to perform their own garbage collection processes in addition to the stripe reclamation. In turn, this reduces write amplification that would occur due to garbage collection processes that are redundant with the stripe reclamation.

At S220, data is written to the storage system. In some implementations, data may be written using the method described herein above with respect to FIG. 1 by selecting a RAID stripe to which data should be written and determining the drives and blocks to which data should be written from among the selected stripes.

At S230, one or more stripes are reclaimed. The stripes may be reclaimed when, for example, new data is to be written and there is insufficient available storage space, when one or more unwanted portions of data are included in a stripe (e.g., expired data), and the like. In some implementations, S230 may further include sending a notification to each drive indicating the erase blocks which have been made available due to the reclamation (i.e., the erase blocks aligned with RAID chunks of the reclaimed stripes).

In an embodiment, reclamation of the stripes is prioritized based on one or more of the following criteria for reducing write amplification: stripe-occupied space, expected expiration times for data stored therein, and wear level.

The stripe-occupied space is the amount of data stored on the stripe. When a stripe is evacuated, any data remaining on the stripe that is still relevant (i.e., which should not be deleted) must be copied to a new stripe before the stripe is erased, thereby resulting in write amplification. In an embodiment, stripes with lower amounts of data stored thereon are prioritized for reclamation to reduce the amount of data to be copied to preserve relevant data.

The expected expiration times are projected times at which data in each stripe is expected to be released from the stripe. To this end, stripes including data having longer expected expiration times may be prioritized over stripes including data having shorter expected expiration times. This allows for waiting until soon-to-expire data is released instead of copying data that will soon be deleted anyway. In an embodiment, the expected expiration times for data in each stripe may be determined as discussed further herein above with respect to S140, FIG. 1.

The wear levels are measures of the amount of wear on erase blocks included in each stripe. Specifically, the wear levels indicate a number of times each erase block has been written to. The wear levels may be determined by querying each drive for wear levels of its respective erase blocks, or may be determined by maintaining a counter which tracks how many times each erase block has been written to. In an embodiment, stripes including RAID chunks aligned with erase blocks having lower wear levels may be prioritized for reclamation.

At S240, when new data needs to be written, erase blocks to which the new data should be written are determined with respect to the reclaimed stripes. Specifically, the determined erase blocks are erase blocks aligned with RAID chunks of the reclaimed stripes such that the new data is written to one or more of the reclaimed stripes. At S250, the new data is written to the determined erase blocks. Writing data to reclaimed stripes rather than occupied stripes reduces write amplification since existing data in the stripes does not need to be first copied before erasing if the stripes have previously been reclaimed.

Figure 3:
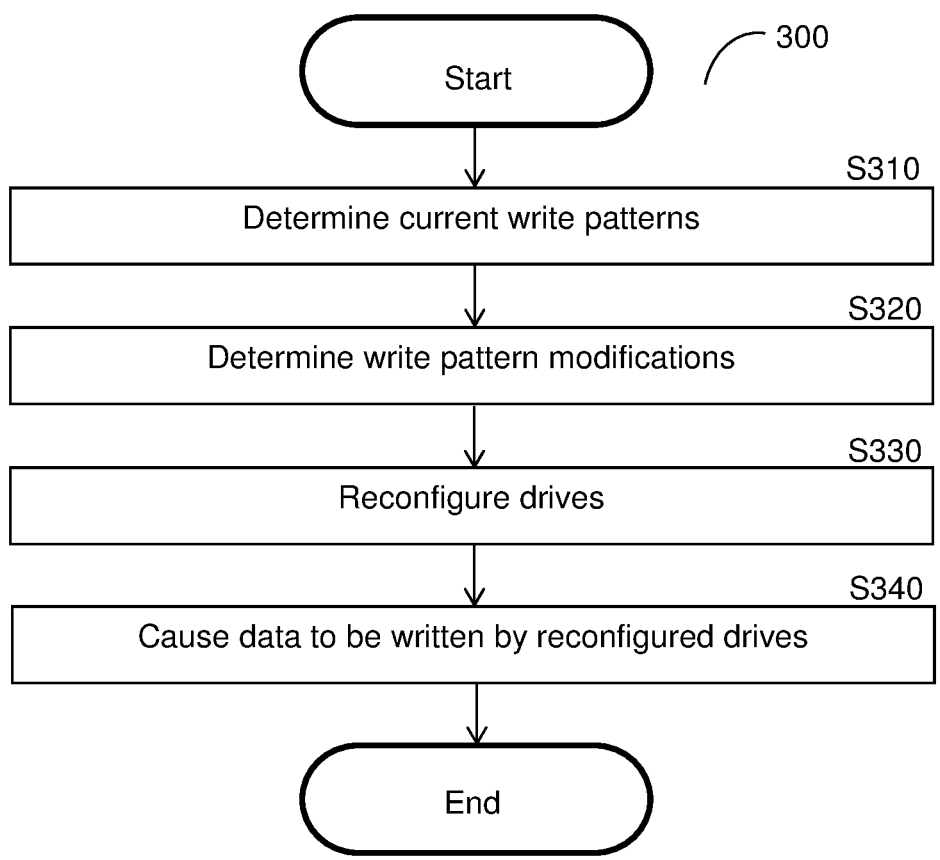
FIG. 3 is a flowchart illustrating a method for reducing write amplification by controlling write patterns of a storage system according to an embodiment.

FIG. 3 is an example flowchart 300 illustrating a method for reducing write amplification by controlling write patterns of a storage system according to an embodiment. The method may be performed by a system (e.g., one of the CNodes 512, FIG. 5) integrated in or in communication with the storage system.

At S310, a current write pattern of each drive in the storage system is determined. The current write pattern may be determined with respect to write pattern parameters such as, but not limited to, write sizes, times between writes, distributions of writes, write concurrency (i.e., number of concurrent write stream), sizes and timings of trim calls to each drive, and the like.

At S320, one or more modifications to the write pattern for each drive are determined. The modifications include modifications to the write pattern parameters of each drive. In an embodiment, the write pattern modifications may be determined based on any of drive models used by the storage system, drive ages, remaining write cycles of each drive, combinations thereof, and the like. To this end, it is noted that most models of drives work better when written into in a sequential order. Also, the number of concurrent streams may affect how each device manages its internal cache and distributes the writes between its erase blocks.

At S330, the drives are reconfigured based on the determined write pattern modifications.

At S340, when data is to be written to the storage system, the data is caused to be written based on the modified storage pattern. Specifically, a request to write data may be received by a system integrated in or communicating with the storage system and the data to be written may be sent to one of the reconfigured drives for writing. The request may be, for example, in the form of an access command as discussed herein below with respect to FIG. 5.

Figure 4:
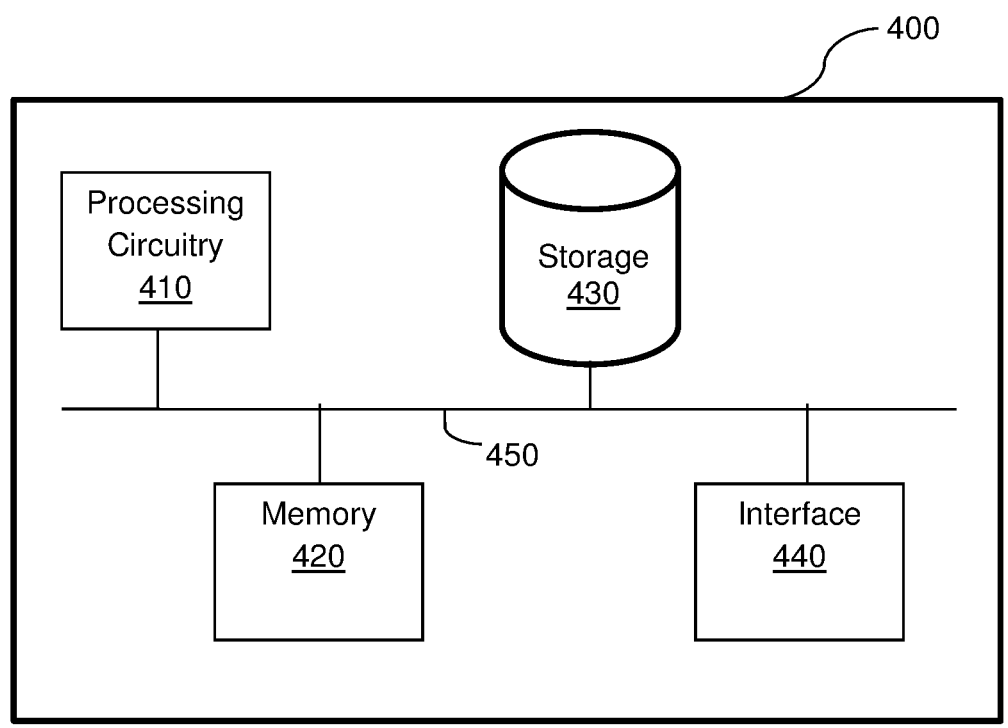
FIG. 4 is a schematic diagram of a system that may be utilized to implement the various disclosed embodiments.

FIG. 4 is a schematic diagram of a system 400 which may be configured to implement the various disclosed embodiments. The system 400 includes a processing circuitry 410, a memory 420, a storage 430, and an interface 440. The components of the system 400 may be connected via a bus 450. The system 400 may be, or may be included in, a compute node (e.g., one of the CNodes 512, FIG. 5).

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be a volatile memory such as, but not limited to, Random Access Memory (RAM). In an embodiment, the memory 420 is configured to store software for execution by the processing circuitry 410. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein.

The storage 430 may be magnetic storage, optical storage, and the like, and may be realized, for example, as flash memory or other non-volatile memory technology, CD-ROM, Digital Versatile Disks (DVDs), or any other non-transitory computer readable medium which can be used to store the desired information. The storage 430 may store the instructions for transfer to and storage in the memory 420 for execution by the processing circuitry 410.

The interface 440 allows the system 400 to receive requests for operations and to access a storage storing persistent state objects. The interface 440 may be, but is not limited to, a network interface.

It should be understood that the embodiments described herein are not limited to the specific architecture illustrated in FIG. 4, and other architectures may be equally used without departing from the scope of the disclosed embodiments.

Figure 5:
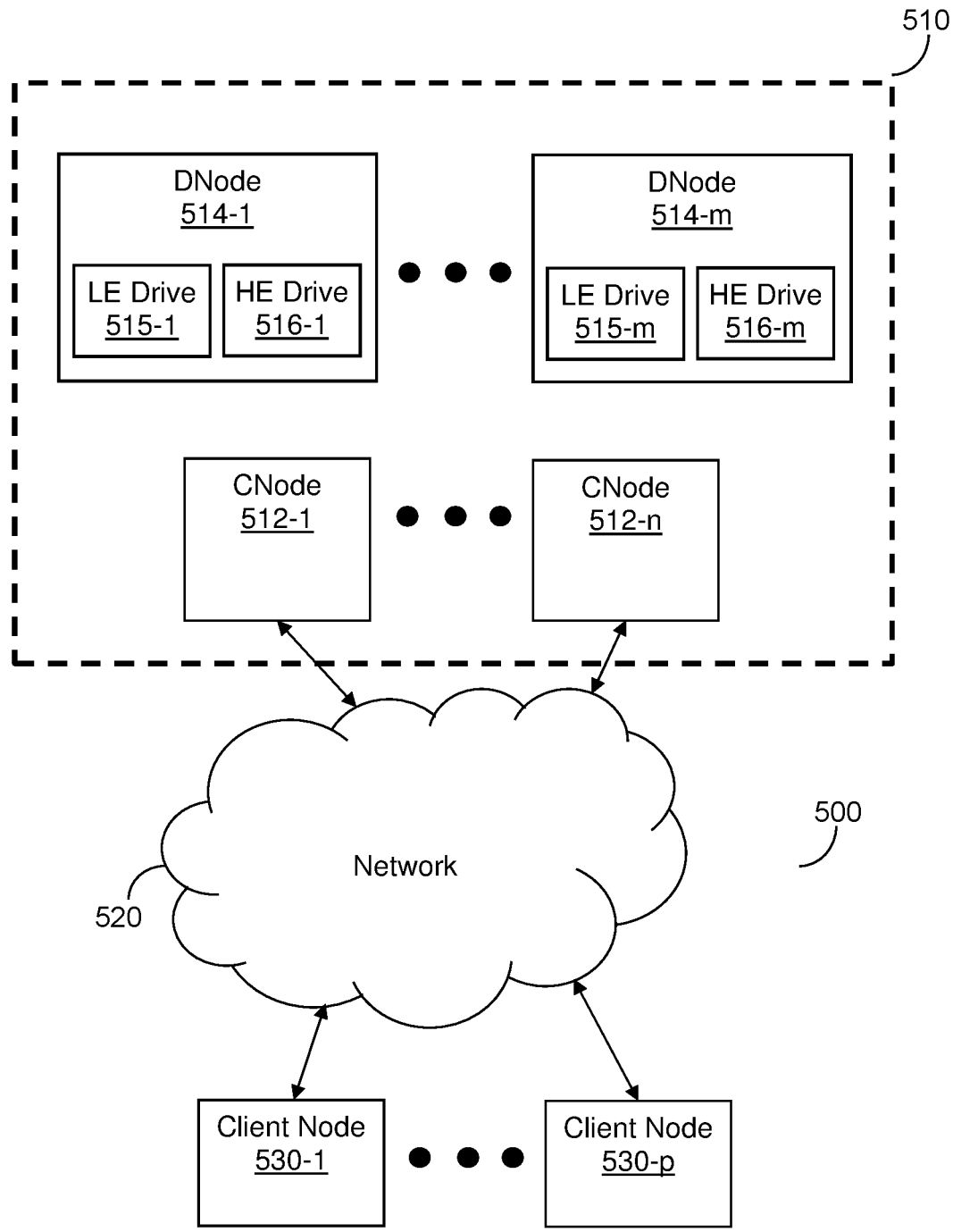
FIG. 5 is a network diagram of a storage system that may have its lifespan prolonged according to various disclosed embodiments.

FIG. 5 is a network diagram 500 illustrating an example distributed storage system 510 including drives whose lifespans may be prolonged according to the various disclosed embodiments. The network diagram 500 includes the distributed storage system 510, a network 520, and client nodes 530-1 through 530-*p* (referred to as a client node 530 or as client nodes 530 for simplicity).

The distributed storage system 510 may be configured as described further in U.S. patent application Ser. No. 16/002,676, assigned to the common assignee, the contents of which are incorporated by reference. The distributed storage system 510 includes a plurality of compute nodes (CNodes) 512-1 through 512-*n* (hereinafter referred to individually as a CNode 512 and collectively as CNodes 512 for simplicity) and a plurality of storage nodes (DNodes) 514-1 through 514-*m* (hereinafter referred to individually as a DNode 514 and collectively as DNodes 514 for simplicity). The CNodes 512 are configured to access data in the DNodes 514, for example, by reading, writing, deleting, and the like.

In an embodiment, the DNodes 514 each include a respective low endurance (LE) drive 515 and a respective high endurance (HE) drive 516. Each of the drives 515 and 516 includes non-volatile memory. Each of the low endurance drives 515 has a lower number of write cycles in its respective lifespan than each of the high endurance drives 516. In an example implementation, the low and high endurance drives may be Flash drives. In a non-limiting example, the Flash drives may be 3D Xpoint drives.

Each CNode 512 may be configured as described herein and, specifically, is configured to manage data writing and deletion to prolong at least the lifespans of the low endurance drives 515. In some implementations, such prolonging of lifespans is accomplished by storing data that is frequently changed in the high endurance drives 516 to reduce numbers of writes to the low endurance drives 515. In various other embodiments, lifespans of the low endurance drives 515 may be prolonged by modifying write and delete behavior with respect to, for example, stripes of RAID schemes, expected expiration times for data, write patterns, and the like.

The network 520 may be, but is not limited to, a wireless, cellular or wired network, a local area network (LAN), a wide area network (WAN), a metro area network (MAN), the Internet, the worldwide web (WWW), similar networks, and any combination thereof. The client node 530 may be, but is not limited to, a server, a personal computer, a laptop, a tablet computer, a smartphone, or any other device configured to store data, access data, or both.

The client node 530 is configured to send access commands to the distributed storage system 510 via the network 520. The CNodes 512 may be configured to translate access commands received from the client nodes 530 and to access the DNodes 514 based on the translated commands. In an example implementation, each CNode 512 may access all of the DNodes 514. As a non-limiting example, NVM Express (NVMe) over Fabrics may be utilized to enable such access.

It should be noted that one low endurance drive 515 and one high endurance drive 516 are shown as being included in each of the DNodes 514 merely for simplicity purposes, and that other numbers of low endurance drives, high endurance drives, or both, may be included in any or all of the DNodes 514 without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for prolonging lifespans of low endurance storage drives, comprising:
    determining an expected expiration time for each of a plurality of blocks, wherein each block includes data of a respective file, wherein the expected expiration of each block is determined based on at least one of: last file update time of the respective file, updates to neighboring files of the respective file from a common parent directory, deletions of neighboring files from a common parent directory, updates to similar files stored in the storage system, deletions of similar files stored in the storage system, and file entropy of the respective file; and writing a portion of data to at least one block of the plurality of blocks based on the expected expiration time for each block.

2. The method of claim 1, further comprising:
determining an expected expiration time for the portion of data, wherein the portion of data is written based further on the expected expiration time for the portion of data.

3. The method of claim 2, wherein the expected expiration time for the portion of data is approximately the same as the expected expiration time of each of the at least one block.

4. The method of claim 1, wherein the at least one drive is a plurality of drives including at least one high endurance drive and at least one low endurance drive, wherein each high endurance drive has a longer total lifespan than each low endurance drive, wherein writing the portion of data to the at least one block of the plurality of blocks further comprises:
writing a first portion of data to at least one block in the at least one high endurance drive based on the expected expiration time for each block in the at least one high endurance drive; and
writing a second portion of data to at least one block in the at least one low endurance drive based on the expected expiration time for each block in the at least one low endurance drive.

5. The method of claim 4, further comprising:
determining, for each of the plurality of drives, a remaining lifespan of the drive based on a number of writes to the drive and a total lifespan of the drive, wherein the first portion of data is written to the at least one high endurance drive based on the remaining lifespan of each high endurance drive, wherein the second portion of data is written to the at least one low endurance drive based on the remaining lifespan of each low endurance drive.

6. The method of claim 4, the at least one high endurance drive including a plurality of first blocks, the at least one low endurance drive including a plurality of second blocks, wherein each block of the plurality of first blocks and of the plurality of second blocks has a number of remaining write cycles before the block is unusable, further comprising:
determining at least one third block to which the first portion of data should be written, wherein the first portion of data is written to the determined at least one third block, wherein the determined at least one third block includes at least one block having the highest number of remaining write cycles among the plurality of first blocks; and determining at least one fourth block to which the second portion of data should be written, wherein the second portion of data is written to the determined at least one fourth block, wherein the determined at least one fourth block includes at least one block having the highest number of remaining write cycles among the plurality of second blocks.

7. The method of claim 4, further comprising:
determining a plurality of erase blocks in the storage system to which each of the first portion of data and the second portion of data should be written, the plurality of erase blocks including at least one first erase block in the at least one high endurance drive and at least one second erase block in the at least one low endurance drive, wherein the storage system utilizes a data virtualization scheme having a plurality of stripes including at least one reclaimed stripe, the plurality of stripes including a plurality of chunks, wherein each of the at least one first erase block and the at least one second erase block is aligned with at least one of the plurality of chunks of the at least one reclaimed stripe, wherein the first portion of data is written to the determined at least one first erase block, wherein the second portion of data is written to the determined at least one second erase block.

8. The method of claim 7, further comprising:
determining at least one stripe of the plurality of stripes to be reclaimed, wherein the at least one stripe to be reclaimed is determined based on at least one of: stripe occupied space of each of the plurality of stripes, expected expiration times for data stored in each of the plurality of stripes, and wear levels of the plurality of erase blocks; and reclaiming the determined at least one stripe.

9. The method of claim 1, wherein the expected expiration of each block is determined based on the last file update time of the respective file.

10. The method of claim 1, wherein the expected expiration of each block is determined based on updates to neighboring files of the respective file from the common parent directory.

11. A non-transitory computer readable medium having stored thereon instructions for causing a processing circuitry to execute a process, the process comprising:
determining an expected expiration time for each of a plurality of blocks, wherein each block includes data of a respective file, wherein the expected expiration of each block is determined based on at least one of: last file update time of the respective file, updates to neighboring files of the respective file from a common parent directory, deletions of neighboring files from a common parent directory, updates to similar files stored in the storage system, deletions of similar files stored in the storage system, and file entropy of the respective file; and
writing a portion of data to at least one block of the plurality of blocks based on the expected expiration time for each block.

12. A system for prolonging lifespans of storage drives, comprising:
a processing circuitry; and
a memory, the memory containing instructions that, when executed by the processing circuitry, configure the system to:
determine an expected expiration time for each of a plurality of blocks, wherein each block includes data of a respective file, wherein the expected expiration of each block is determined based on at least one of: last file update time of the respective file, updates to neighboring files of the respective file from a common parent directory, deletions of neighboring files from a common parent directory, updates to similar files stored in the storage system, deletions of similar files stored in the storage system, and file entropy of the respective file; and
write a portion of data to at least one block of the plurality of blocks based on the expected expiration time for each block.

13. The system of claim 12, wherein the system is further configured to:
  determine an expected expiration time for the portion of data, wherein the portion of data is written based further on the expected expiration time for the portion of data.

14. The system of claim 13, wherein the expected expiration time for the portion of data is approximately the same as the expected expiration time of each of the at least one block.

15. The system of claim 12, wherein the at least one drive is a plurality of drives including at least one high endurance drive and at least one low endurance drive, wherein each high endurance drive has a longer total lifespan than each low endurance drive, wherein the system is further configured to:
  write a first portion of data to at least one block in the at least one high endurance drive based on the expected expiration time for each block in the at least one high endurance drive; and
  write a second portion of data to at least one block in the at least one low endurance drive based on the expected expiration time for each block in the at least one low endurance drive.

16. The system of claim 15, wherein the system is further configured to:
  determine, for each of the plurality of drives, a remaining lifespan of the drive based on a number of writes to the drive and a total lifespan of the drive, wherein the first portion of data is written to the at least one high endurance drive based on the remaining lifespan of each high endurance drive, wherein the second portion of data is written to the at least one low endurance drive based on the remaining lifespan of each low endurance drive.

17. The system of claim 15, the at least one high endurance drive including a plurality of first blocks, the at least one low endurance drive including a plurality of second blocks, wherein each block of the plurality of first blocks and of the plurality of second blocks has a number of remaining write cycles before the block is unusable, wherein the system is further configured to:
  determine at least one third block to which the first portion of data should be written, wherein the first portion of data is written to the determined at least one third block, wherein the determined at least one third block includes at least one block having the highest number of remaining write cycles among the plurality of first blocks; and
  determining at least one fourth block to which the second portion of data should be written, wherein the second portion of data is written to the determined at least one fourth block, wherein the determined at least one fourth block includes at least one block having the highest number of remaining write cycles among the plurality of second blocks.

18. The system of claim 15, wherein the system is further configured to:
  determine a plurality of erase blocks in the storage system to which each of the first portion of data and the second portion of data should be written, the plurality of erase blocks including at least one first erase block in the at least one high endurance drive and at least one second erase block in the at least one low endurance drive, wherein the storage system utilizes a data virtualization scheme having a plurality of stripes including at least one reclaimed stripe, the plurality of stripes including a plurality of chunks, wherein each of the at least one first erase block and the at least one second erase block is aligned with at least one of the plurality of chunks of the at least one reclaimed stripe, wherein the first portion of data is written to the determined at least one first erase block, wherein the second portion of data is written to the determined at least one second erase block.

19. The system of claim 18, wherein the system is further configured to:
  determine at least one stripe of the plurality of stripes to be reclaimed, wherein the at least one stripe to be reclaimed is determined based on at least one of: stripe-occupied space of each of the plurality of stripes, expected expiration times for data stored in each of the plurality of stripes, and wear levels of the plurality of erase blocks; and
  reclaiming the determined at least one stripe.

20. The system of claim 12, wherein the expected expiration of each block is determined based on the last file update time of the respective file.

21. The system of claim 12, wherein the expected expiration of each block is determined based on updates to neighboring files of the respective file from the common parent directory.

* * * * *